United States Patent [19]

Wagman et al.

[11] Patent Number: 4,997,152

[45] Date of Patent: Mar. 5, 1991

[54] HOIST-TYPE SUPPORT FOR GAME

[76] Inventors: Harold H. Wagman; Chris L. Wagman; Craig L. Wagman, all of 193 Tuscarora Dr., York, Pa. 17403

[21] Appl. No.: 524,731

[22] Filed: May 17, 1990

[51] Int. Cl.[5] .............................................. F16H 11/38

[52] U.S. Cl. ................................ 248/168; 248/188.5; 248/320

[58] Field of Search .................. 248/163.1, 163.2, 168, 248/188.5, 320, 328; 24/115 J, 129 C, 131 R

[56] References Cited

U.S. PATENT DOCUMENTS

| | | | |
|---|---|---|---|
| 366,833 | 7/1887 | Hipwell . | |
| 794,728 | 7/1905 | Minetti | 24/115 J |
| 1,806,453 | 5/1931 | Goudeao . | |
| 2,466,496 | 4/1949 | Smith . | |
| 2,694,542 | 11/1954 | Barbakoff | 248/168 |
| 2,894,313 | 7/1975 | Miller . | |
| 2,919,093 | 12/1959 | Mooney | 248/168 |
| 2,934,302 | 4/1960 | Langert | 248/328 |
| 3,765,630 | 10/1973 | Woolley | 248/163.2 |
| 4,024,851 | 5/1977 | Boda . | |

FOREIGN PATENT DOCUMENTS

| | | |
|---|---|---|
| 11837 | 4/1928 | Australia . |
| 400518 | 7/1907 | France . |

*Primary Examiner*—Robert L. Wolfe

*Attorney, Agent, or Firm*—C. Hercus Just

[57] ABSTRACT

A hoist-type support for use by hunters to support game objects and including a top head having circumferentially-spaced notches in excess of two and each notch pivotally receiving the upper end of a leg in a manner to limit the outward movement of the leg beyond a maximum angle of 70° to the horizontal plane of the top head. A block and tackle unit having two blocks with the tackle extending therebetween, one of said blocks being connected to and depending from the top head and also having one end of the tackle fixed thereto. The other block having means to which game objects are connected for support thereby and the block and tackle unit also having a locking member which is operable automatically to prevent lowering of the other block after a game object has been connected thereto and elevated to a desired position.

7 Claims, 2 Drawing Sheets

FIG. 3
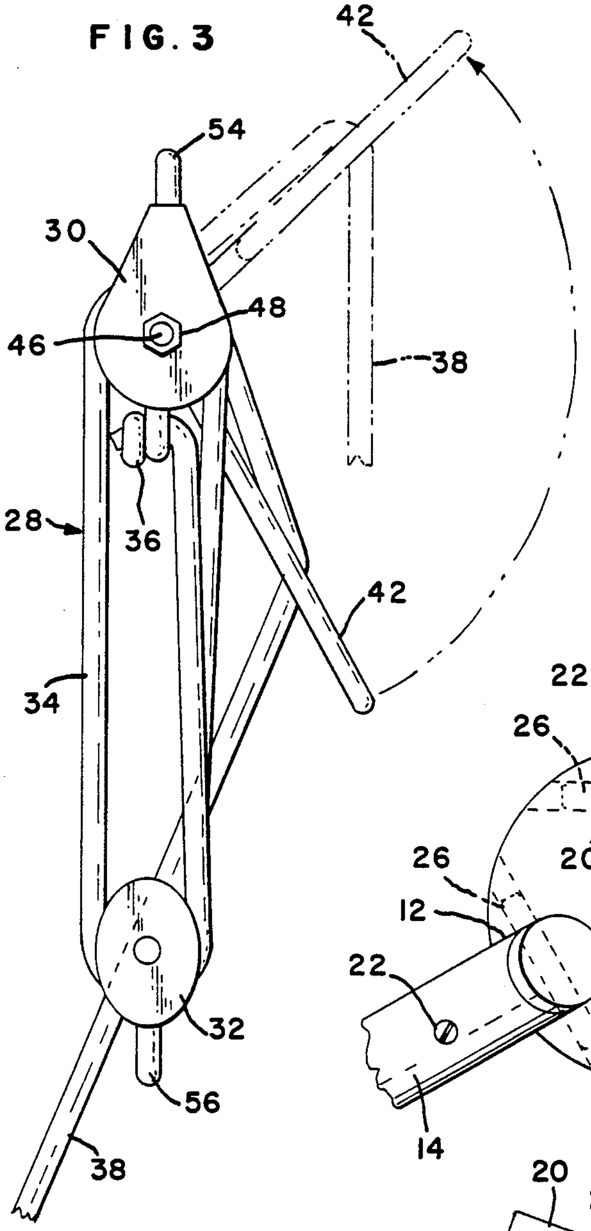
FIG. 4
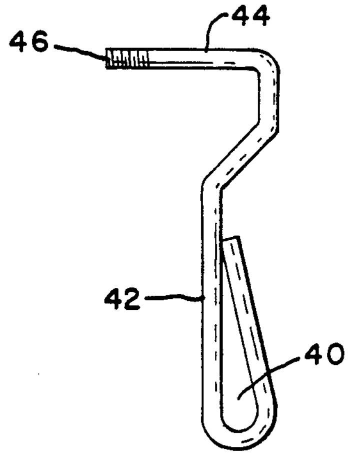
FIG. 5
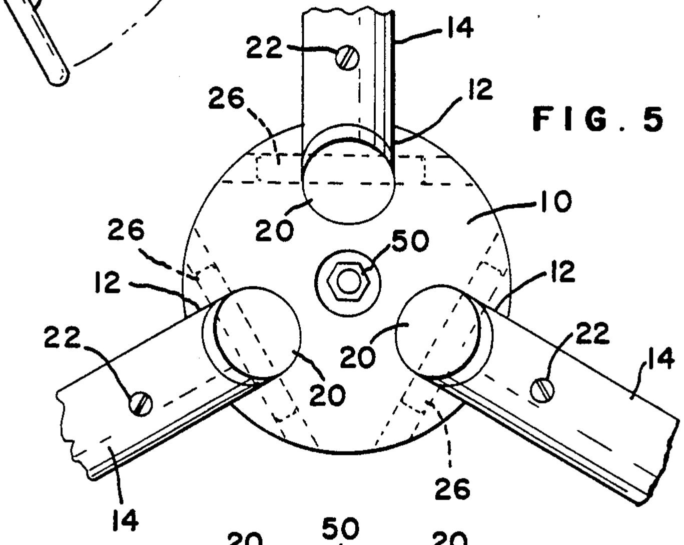
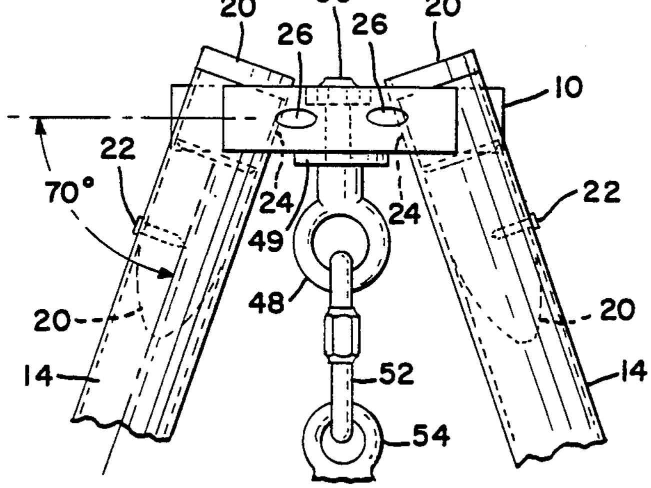
FIG. 6

HOIST-TYPE SUPPORT FOR GAME

BACKGROUND OF THE INVENTION

When a game object, such as a deer or bear, has been killed, it is desirable as soon thereafter as convenient to eviscerate the carcass, preferably while suspended. Certain additional steps also are taken to render the flesh as palatable as possible. Often a deer or bear will dress at least at fifty or more pounds in weight and such carcasses are suspended from make-shift means, such as a rail between two trees and the deer or bear is hoisted manually to have the head or hind legs tied to the rail. This is hard and cumbersome work and the present invention is not only much handier to operate but also requires minimum muscle power and can actually be operated by one individual if necessary.

SUMMARY OF THE INVENTION

The game support comprising the present invention is relatively simple in construction, is collapsible into a small bundle and is readily arranged in operable position within a few minutes of time. It consists preferably of three extensible legs which are connected at one end to a top head that has circumferentially-spaced peripheral notches within which the upper ends of the legs respectively are disposed and pivot means commonly extend through the walls of the notches and the ends of the legs in a manner to limit outward uniform movement of the legs to a maximum angle of approximately 70° to the plane of the horizontal top head.

One block of a block and tackle unit is suspended from the top head and the other block, which depends below the one block, has one end of the tackle connected thereto and the opposite end portion of the tackle extends through a pivoted locking member of a wedge-like configuration which operates automatically to frictionally engage said opposite end portion of the tackle, after a deer or otherwise has been suspended from the lower block, and the locking member functions to snub reverse movement of the tackle and thereby hold the deer or bear suspended for such functions as are necessary to dress the carcass. The pivot of the locking member also can be the pivot for the pulleys of the upper block.

The legs of the support may be either of solid metallic rod stock or, preferably of tubular metal stock, such as aluminum and thereby minimize weight. When tubular, the uppermost end of each leg has a short solid plug forced into the tube and such assembly is drilled transversely to receive a pivot pin which also extends through the walls of each notch in the top head which receives said end of the leg in a manner to restrict outward movement of the lower portion of the leg relative to the top head by the tip end of the leg abutting the inner wall of the notch.

BRIEF DESCRIPTION OF THE DRAWINGS

FIG. 3 is a view similar to FIG. 2, but showing the block and tackle unit in side elevation and, in phantom, illustrating the locking position of the tackle at the completion of a hoisting operation, said view, in full lines, showing the position of the locking member when idle, as during a hoisting operation.

FIG. 4 is a side elevation of the locking member per se.

FIG. 5 is a fragmentary plan view of the upper end of the support and hoist shown in FIG. 1 and showing only the upper ends of the legs as pivotally-connected to the top head of the device.

FIG. 6 is a side elevation of the head and fragmentary legs of the upper end of the device shown in FIG. 5 and also in FIG. 1.

DETAILED DESCRIPTION OF THE PREFERRED EMBODIMENTS OF THE INVENTION

The hoist and support comprising the present invention primarily is a tripod and is designed for use, for example, by a hunter incident to hanging, skinning and butchering wild game, such as deer or bear, especially at a camp where such hunting has occurred. The present invention makes it no longer necessary to hang the game from a tree limb or from a bar suspended between a pair of trees, and the design is such that, if necessary or desirable, one person may operate the device to lift the game in order to insure cooling, draining, and field dressing the game.

Figure 1:
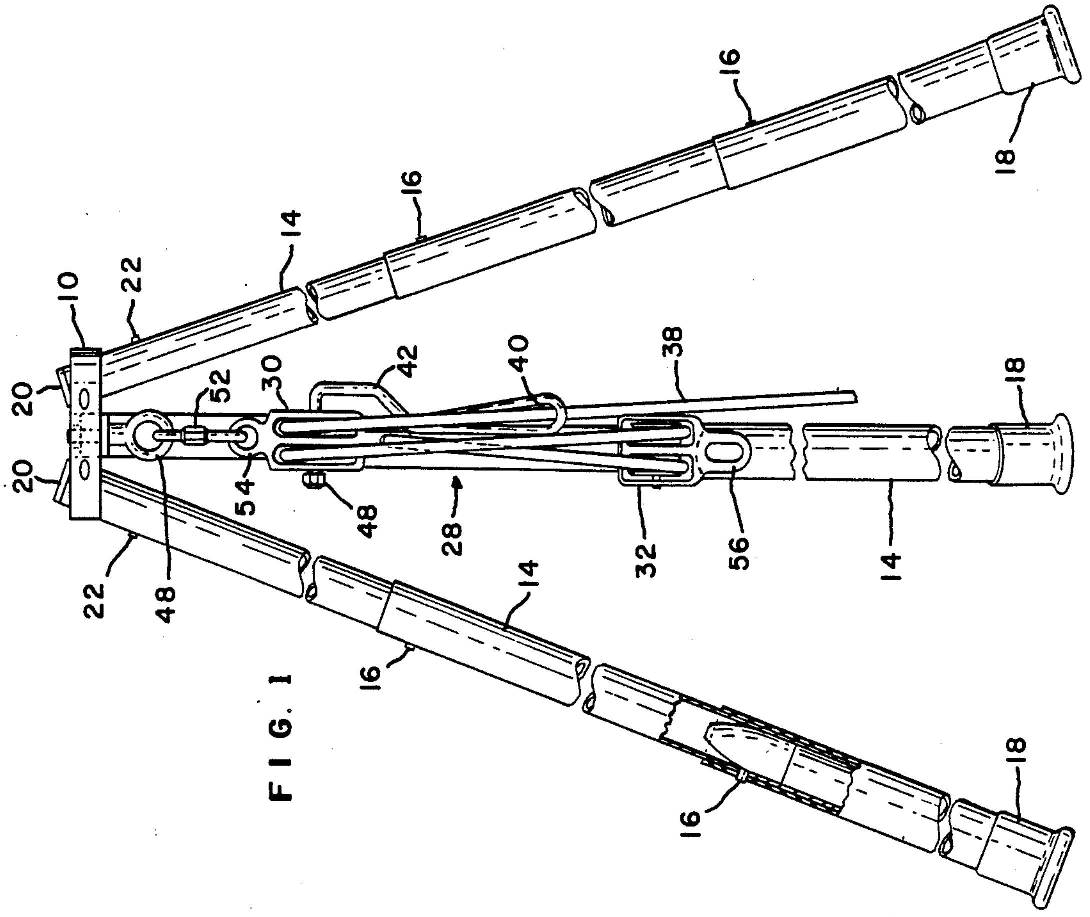
FIG. 1 is a foreshortened vertical elevation of a hoist and support for game.

Referring to FIG. 1, the preferred structure of the hoist comprises a top head 10 which, as shown in FIG. 5, in plan view, preferably is circular, and in the latter figure, it will be seen that the head 10 is provided with a plurality, at least three, peripherally-spaced notches 12, which respectively receive the upper ends of the legs 14. If desired, the legs may be formed from solid bar stock, preferably of light-weight metal, such as aluminum, for example, but preferably the legs 14, as shown in FIG. 1, are formed from tubular metal stock, such as aluminum, and they are formed in collapsible sections for convenience of longitudinal adjustment of the legs, as well as compactness when arranged in idle condition, such as when being carried in a casing or otherwise, not shown.

In the embodiments specifically shown in FIG. 1, the various longitudinally-adjustable sections of the legs 14 are clearly shown as comprising a plurality of sections of decreasing diameter, starting at the lower end thereof and progressing to the upper end of each leg. The sections may be locked in adjusted position by conventional means, such as locking buttons 16 which are spring-pressed and arranged to extend through matching holes in each pair of mating sections of the legs. The buttons 16 are of the spring-pressed type but details thereof are not shown in view of the common nature of such structure. The lowermost section of each leg preferably is provided with a suitable foot member 18 which is engageable with the ground or other supporting surface when in use. The upper end of each leg or of the uppermost tubular member of each leg is provided with a plug-like member 20, preferably of solid stock material and is united with the tubular uppermost leg section by a press-fit or otherwise, including, if desired, a threaded screw 22.

The purpose of the plug-like members 20 is to afford strength to the upper ends of the legs which are closely and pivotally received in the notches 12 of the top head 10. As shown particularly in FIG. 6, the innermost ends 24 of the notches 12 are disposed at an angle to the vertical axis of the circular top head 10 and this arrangement serves as stop means for limiting the outward movement of the lower ends of the legs 14, such as, for example, to the desired spread position of the legs, as shown in FIG. 1. It has been found from experience that a preferred workable position of the legs with respect to the top head 10 is approximately 70°, as indicated in FIG. 6, and this final position of the spread legs is maintained by the engagement of the upper ends of the legs with the innermost end surfaces 24 of the notches 12, as also shown in FIG. 6. The width of the notches 12 also preferably is substantially the same as the diameter of the upper ends of the legs 14, while allowing very limited clearance between the respective surfaces to permit reasonably ready movement of the legs to the extended position thereof, shown in FIG. 1. Pivotal connection of the upper ends of the legs is effected by means of pivot pins 26 which extend commonly through pivot holes which extend transversely through the upper ends of the legs 14 and the sidewalls of the notches 12 in the top head 10.

Figure 2:
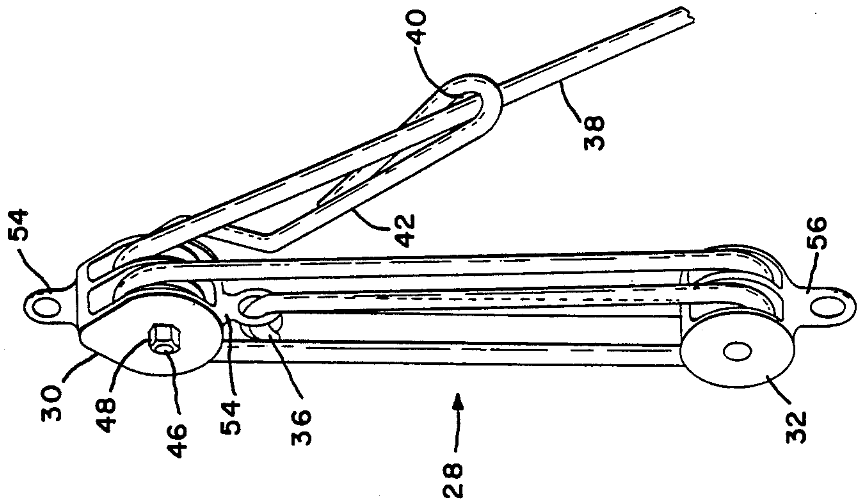
FIG. 2 is a perspective side elevation, on a larger scale than that employed in FIG. 1, and illustrating the block and tackle unit otherwise shown in FIG. 1, and including the locking member for said unit at the completion of a hoisting operation.

The hoisting mechanism of the invention is illustrated in FIGS. 1-3, with an incidental element thereof shown in FIG. 4. Referring to these figures, the hoisting mechanism 28 comprises a block and tackle unit which includes an upper block 30, lower block 32 and a flexible tackle member 34, which extends between said blocks. One end 36 of tackle member 34 is affixed to block 30 and then extends around both of the blocks with the opposite end portion 38 of the tackle extending downwardly after extending through the wedge-shaped opening 40 of locking or latching member 42. In accordance with the present invention, it is preferred that the member 42 be provided with a pivot section 44 which is transverse to the remaining portion of the member 42 and the terminal end 46 thereof preferably is threaded for engagement by a nut 50, as seen in FIGS. 1-3. From these figures it also will be seen that the pivot section 44 of member 42 comprises the pivot for the pulleys of the upper block 30.

The hoisting mechanism 28 is connected to the top head 10 by an eyelet 48 that has a shank extending upwardly therethrough and capped by another nut 50. Eyelet 48 also has a washer 49, see FIG. 6, the periphery of which limits the inward movement of the legs toward each other, such as when arranging the tripod for moving or storage. A connecting link 52 extends from eyelet 48 downwardly and the opposite end of link 52 is connected to an eye 54 of upper block 30. The lower block 32 is also provided with a depending eye 56 to which any convenient portion of the game may be connected for the purposes stated above, such as hanging, skinning, butchering, draining or otherwise.

From the foregoing, it will be seen that the preferred operation of the support and hoist comprising the present invention, may easily be unpacked from compact condition and set up by extending the legs 14 to any desired length within the capabilities of the intended maximum length thereof. After adjusting the legs to said length, and the tripod is established in any desired location, the game is carried to the eye 56 of the lower block 32 and is connected thereto by any convenient means, such as suitable rope or otherwise. The hoisting mechanism 28 will be arranged in depending manner, such as illustrated in FIG. 1, and then the opposite end portion 38 of the tackle is pulled downwardly with respect to the upper block 30, as somewhat shown in exemplary manner in FIGS. 1-3, while said tackle extends through the opening 40 of the locking member 42, which then is in the position shown in FIGS. 1-3. When the hoisting has been completed to a desired extent, and while still holding the tackle portion 38, pulling force is released and due to wedging engagement of the tackle with the wedge-shaped opening 40, the weight of the game which pulls against the lower block 32 will tend to move said block downwardly and in so doing, said engagement of the tackle within the wedge-shaped opening 40 will raise the locking member 42 to the position shown in phantom in FIG. 3, and such wedging of the tackle will stop the lowering of the game as it depends from the lower block 32 and the tackle then may be released as it is locked in the position shown in FIG. 3. To lower the suspended game when the locking member 42 is in the phantom position, shown in FIG. 3, it is only necessary to pull upon the depending or opposite end portion 38 of the tackle from that shown in FIG. 3, which causes the locking or latching member 42 to assume the lowered position, shown in full lines in FIGS. 1-3 and thereafter by extending the portion 38 of the tackle somewhat to the direction especially shown in FIG. 2, the tackle may pass upwardly through wedge-shaped opening 40 without effecting latching movement of the member 42. The game may then be disconnected from the lower block 32.

It, thus, will be seen that the present invention provides relatively simple, compact, and readily operated hoist and support for game at a campsite or otherwise by exerting minimum effort to effect hoisting of the game, as well as lowering the same and such operations may be achieved by one person, if desired or necessary.

To assist especially in ventilating the carcass, the invention, in commercial form, may include a suitable spreader bar (not shown), preferably having limited adjustable length, which may be included with the hoist as sold and used. For purposes of maintaining the equipment in sanitary condition and freedom from rust, the same preferably is manufactured from aluminum material where possible, which also maintains the overall weight to a minimum for handling both in use, as well as when stored.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

We claim:

1. A hoist-type support for game objects comprising in combination, a. a top head having similar circumferentially-spaced peripheral notches, b. at least three similar legs each having one end received respectively in said notches, c. pivot means extending respectively through said one end of each leg and opposite walls of each notch and said one end of each leg being engageable with the innermost wall of each notch to limit the outward pivotal movement of each leg to a maximum acute angle of approximately 70° to the horizontal plane of said top head when in use, d. a block and tackle unit having a pair of blocks, e. support means attachable to one block of said block and tackle unit and depending from the center of said top head, f. means on said one block of said unit to which one end of said tackle is connected, g. a pivoted locking member on said one block through which the opposite end portion of said tackle extends and said locking member having means to engage said opposite end portion which extends through said locking member and secures cures it against retractable movement when said opposite end portion of said tackle has been pulled to raise the other block of the unit toward said one block, and h. means on said other block having supporting means attachable to a game object and support it in depending manner when said unit has been operating to raise said object to a desired level.

2. The support according to claim 1 wherein said locking member has a wedge-type configuration through which said tackle extends incident to hoisting said other block and a load suspended therefrom, whereby when said hoisting is stopped and pulling upon said tackle is released, said tackle becomes wedged in said configuration in a manner to maintain said load in elevated position.

3. The support according to claim 2 wherein said locking member is pivotally supported relative to said first-mentioned block for movement between an upper clinching position and a lower releasing position in which said tackle is freely moveable incident to hoisting said load.

4. The support according to claim 1 wherein the pulley of said first-mentioned block is supported upon a shaft portion of said locking member.

5. The support according to claim 4 in which said locking member has a wedge-type configuration extending angularly from said shaft portion of said locking member.

6. The support according to claim 1 wherein said legs are tubular and the ends thereof which are pivotally-connected to said top head each have solid plug-like elements of limited length inserted therein and flush with said ends of the legs, and the composite ends thus formed have transverse holes therethrough to receive pivot pins which extend therethrough commonly with similar holes in the adjacent sidewalls of said peripheral notches in said head which also receive said pivot pins.

7. The support according to claim 6 wherein said tubular legs are sectional and the sections thereof have at least limited lengths of telescopic portions and also include latching means operable to maintain said sections of said legs in desired longitudinally adjusted positions.

* * * * *